(12) United States Patent
Aono et al.

(10) Patent No.: US 7,293,453 B2
(45) Date of Patent: Nov. 13, 2007

(54) MISFIRE DETECTION SYSTEM FOR INTERNAL COMBUSTION ENGINE (75) Inventors: Toshihiro Aono, Abiko (JP); Eisaku Fukuchi, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/471,518

(22) Filed: Jun. 21, 2006

(65) Prior Publication Data
US 2006/0288768 A1 Dec. 28, 2006

(30) Foreign Application Priority Data
Jun. 23, 2005 (JP) ............................. 2005-182767

(51) Int. Cl.
*G01M 15/00* (2006.01)
(52) U.S. Cl. ..................... 73/117.3; 701/111
(58) Field of Classification Search ............. 73/116, 73/117.2, 117.3, 118.1; 701/29, 101, 102, 701/111; 340/438, 439, 441
See application file for complete search history.

(56) References Cited
U.S. PATENT DOCUMENTS

| 5,379,634 | A | 1/1995 | Kuroda et al. |
| 5,832,404 | A | 11/1998 | Amano |
| 5,862,506 | A | 1/1999 | Lynch et al. |
| 6,112,149 | A * | 8/2000 | Varady et al. ............... 701/111 |
| 6,885,932 | B2 * | 4/2005 | Liu et al. ..................... 701/103 |
| 6,907,341 | B2 * | 6/2005 | Aono et al. .................. 701/111 |
| 7,155,965 | B2 * | 1/2007 | Kim .......................... 73/117.3 |
| 2001/0018906 | A1 | 9/2001 | Lehner et al. |
| 2004/0122585 | A1 * | 6/2004 | Aono et al. .................. 701/111 |
| 2005/0056086 | A1 * | 3/2005 | Lee et al. ..................... 73/116 |
| 2006/0000264 | A1 * | 1/2006 | Kim .......................... 73/117.3 |

FOREIGN PATENT DOCUMENTS
JP 3463476 8/2003

OTHER PUBLICATIONS
European Search Report dated Sep. 29, 2006 (Four (4) pages).

* cited by examiner

*Primary Examiner*—Eric S. McCall
(74) *Attorney, Agent, or Firm*—Crowell & Moring LLP (57) ABSTRACT When a fuel cut command is issued, a time required for a crankshaft of each cylinder to rotate through a certain angle is stored in one memory per cylinder. In a stage of engine production, a combustion variation per cylinder is stored in another memory. When fuel is supplied, a particular component is extracted from a value obtained by subtracting the sum of the time required for the rotation in a non-combustion state and the combustion variation from the time required for the rotation corresponding to a cylinder determined to be in a combustion stroke. The occurrence of a misfire is determined when the extracted particular component exceeds a threshold.

2 Claims, 6 Drawing Sheets

MISFIRE DETECTION SYSTEM FOR INTERNAL COMBUSTION ENGINE

BACKGROUND OF THE INVENTION

1. Field of the Invention

The present invention relates to a system for accurately detecting the presence or absence of a misfire in an internal combustion engine. More particularly, the present invention relates to a misfire detection system for detecting a misfire repeated per 360° CA (crank angle) (i.e., an opposed cylinder misfire) with high accuracy.

2. Description of the Related Art

One known misfire detection system for a multi-cylinder internal combustion engine comprises an angular speed detecting unit for detecting an angular speed of rotation of a crankshaft during combustion of each cylinder, a first rotation change computing unit for computing a first rotation change by determining a deviation in angular speed between two cylinders in which an explosion stroke takes place successively, a second rotation change computing unit for computing a second rotation change by determining a deviation in angular speed between the two cylinders at timing before 360° CA from the timing when the angular speeds have been detected by the first rotation change computing unit to compute the first rotation change, an addition unit for adding the first rotation change computed by the first rotation change computing unit and the second rotation change computed by the second rotation change computing unit, and a misfire detecting unit for detecting a misfire generated per 360° CA by comparing the added rotation change obtained from the addition unit with a preset determination value (see Patent Document 1: Japanese Patent No. 3463476).

It has been regarded that the opposed cylinder misfire can be detected with high accuracy by using the known misfire detection system constituted as described above.

SUMMARY OF THE INVENTION

Let now look at, for example, the case of detecting a misfire in a 6-cylinder engine by employing the above-described related art. An angular speed in the explosion stroke of each cylinder is assumed to be $\omega(i)$ where i represents the sampling number. Because the first rotation change computed by the first rotation change computing unit is $\omega(i)-\omega(i-1)$ and the second rotation change computed by the second rotation change computing unit is $\omega(i-3)-\omega(i-4)$, an output of the addition unit is given as $\{\omega(i)-\omega(i-1)\}+\{\omega(i-3)-\omega(i-4)\}$.

When a misfire is generated in the cylinder that is in the explosion stroke at the i-th sampling timing and the (i-3)-th sampling timing, the following formulae;

$$\omega(i)<\omega(i-1)$$

$$\omega(i-3)<\omega(i-4)$$

are satisfied on an assumption that there is no error in the angular speed of each cylinder. Accordingly, the output of the addition unit is expressed by:

$$\{\omega(i)-\omega(i-1)\}+\{\omega(i-3)-\omega(i-4)\}<0$$

Thus, the misfire can be detected by determining whether the above formula is satisfied or not.

However, if there is an error in the angular speed of each cylinder, the following formulae;

$$\omega(i)<\omega(i-1)$$

$$\omega(i-3)<\omega(i-4)$$

are not always satisfied even when a misfire is generated in the cylinder that is in the explosion stroke at the i-th sampling timing and the (i-3)-th sampling timing. In other words, the presence or absence of the opposed cylinder misfire cannot be determined based on whether the following formula is satisfied or not:

$$\{\omega(i)-\omega(i-1)\}+\{\omega(i-3)-\omega(i-4)\}<0$$

An object of the present invention is to provide a misfire detection system capable of detecting a misfire in an internal combustion engine with high accuracy.

To achieve the above object, the present invention provides a misfire detection system for an internal combustion engine, comprising a rotation detecting unit for measuring a time required for a crankshaft of an internal combustion engine to rotate through a certain angle, and a signal processing unit for processing the time required for the rotation and detecting a misfire in the internal combustion engine, wherein the signal processing unit comprises a non-combustion state time-required-for-rotation memory for storing the time required for the rotation per cylinder when a fuel cut command is issued; a combustion variation memory in which a combustion variation per cylinder is stored in a stage of engine production; a filter for extracting a particular component from a value obtained by subtracting the sum of the time required for the rotation in a non-combustion state and the combustion variation, which are outputted respectively from the two memories, corresponding to a cylinder determined to be in the combustion stroke, from the time required for the rotation outputted from the rotation detecting unit; and a threshold determination unit for determining the occurrence of a misfire when an output of said filter exceeds a threshold.

According to the present invention, it is possible to compensate an error of the time required for the rotation, which is caused by a manufacturing error of a ring gear and combustion variations, and to detect a misfire, particularly an opposed cylinder misfire, with high accuracy. Since the misfire can be detected with high accuracy, unburned fuel can be prevented from being released to the atmosphere.

DESCRIPTION OF THE PREFERRED EMBODIMENTS

Figure 1:
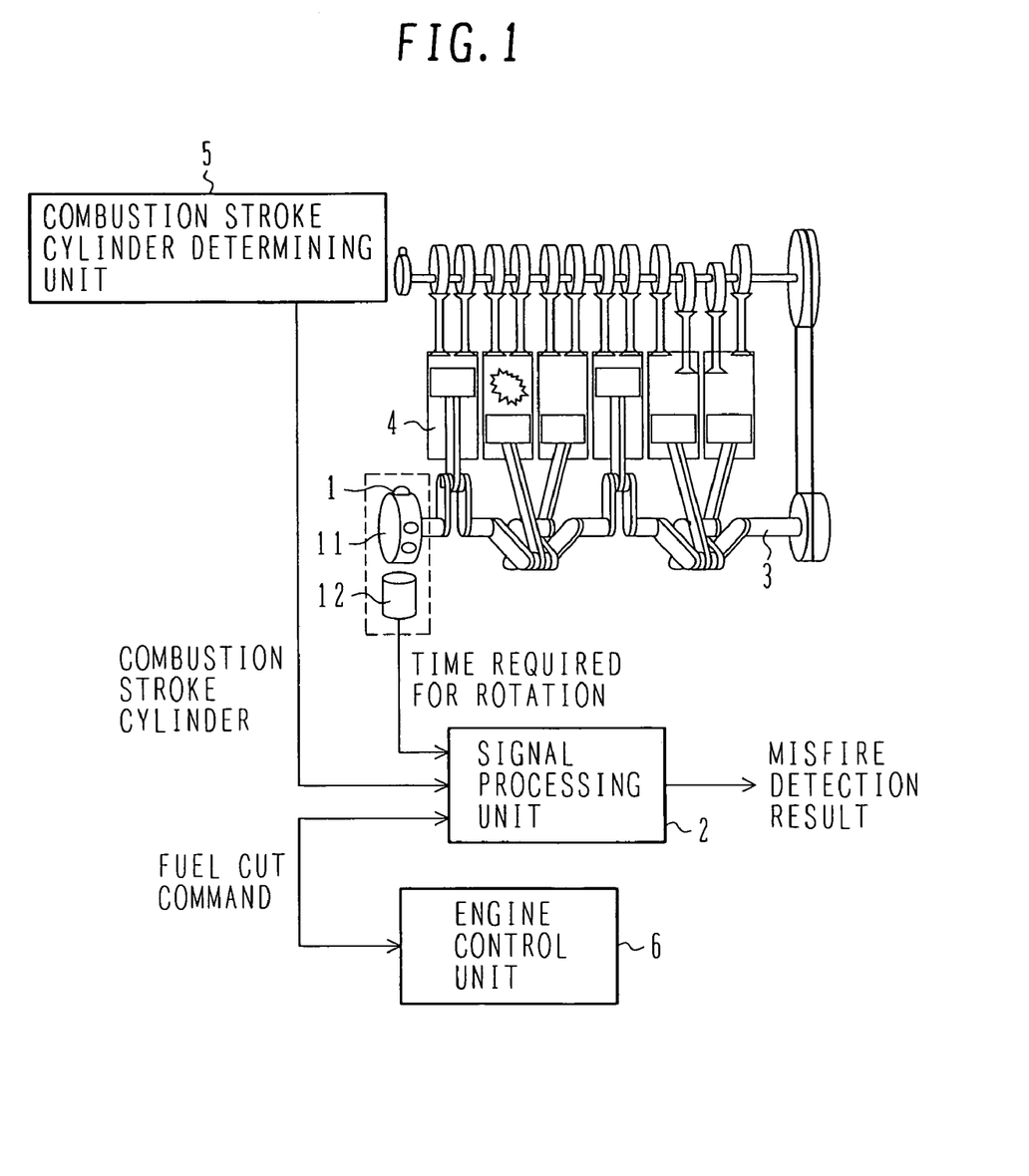
FIG. 1 is a block diagram of a misfire detection system according to a first embodiment of the present invention.

FIG. 1 is a block diagram of a misfire detection system according to a first embodiment of the present invention.

The first embodiment of the present invention will be described below with reference to FIG. 1.

The misfire detection system mainly comprises a rotation detecting unit 1 for measuring a time required for a crankshaft of an internal combustion engine to rotate through a certain angle, and a signal processing unit 2 for processing the time required for the rotation and detecting a misfire in the internal combustion engine.

Figure 2A:
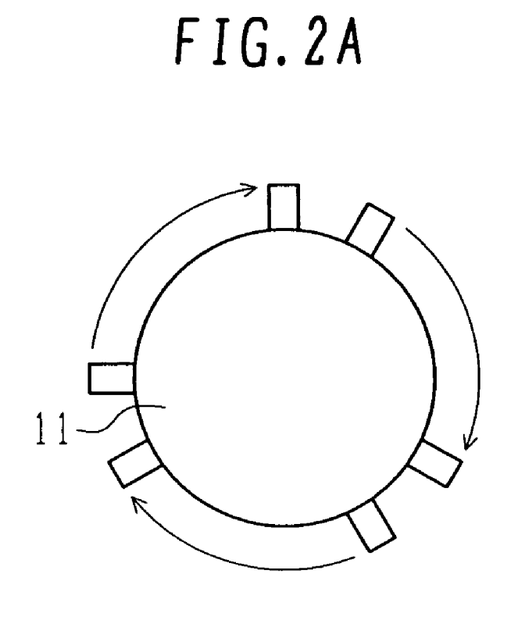
FIGS. 2A and 2B are each a schematic view showing one example of a ring gear in the first embodiment of the present invention.
Figure 2B:
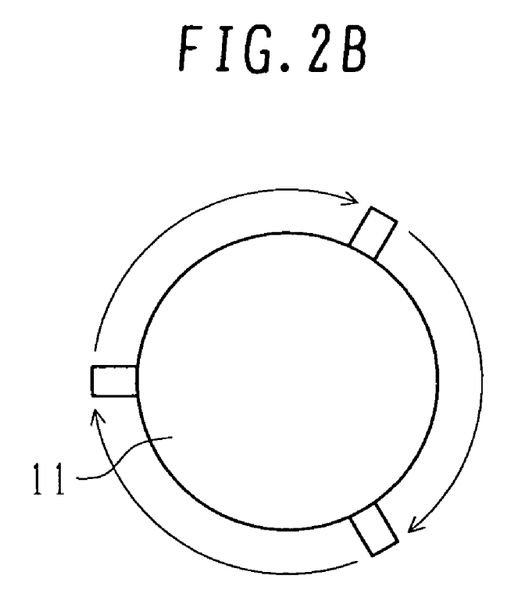

The rotation detecting unit 1 comprises a ring gear 11 and a magnetic sensor 12. The ring gear 11 is provided with teeth as shown in FIGS. 2A and 2B. When each of the teeth comes close to the magnetic sensor 12, an output of the magnetic sensor 12 is changed. By measuring the interval at which the output of the magnetic sensor 12 is changed, the time required for the ring gear 11 (crankshaft) to rotate the certain angle is detected. FIGS. 2A and 2B show the ring gear 11 suitable for use in a 6-cylinder internal combustion engine. In the case of the 6-cylinder internal combustion engine, because three cylinders are subjected to explosion while the crankshaft makes one rotation, a tooth-to-tooth circumferential span indicated by an arrow-headed circular arc in each of FIGS. 2A and 2B can be regarded as an angle through which the ring gear 11 rotates while one cylinder is in an explosion stroke. The tooth-to-tooth circumferential span in FIG. 2A corresponds to an angle through which the ring gear 11 rotates during the explosion stroke of one cylinder when an engine revolution speed is low, and the tooth-to-tooth circumferential span in FIG. 2B corresponds to an angle through which the ring gear 11 rotates during the explosion stroke of one cylinder when the engine revolution speed is high.

Figure 3:
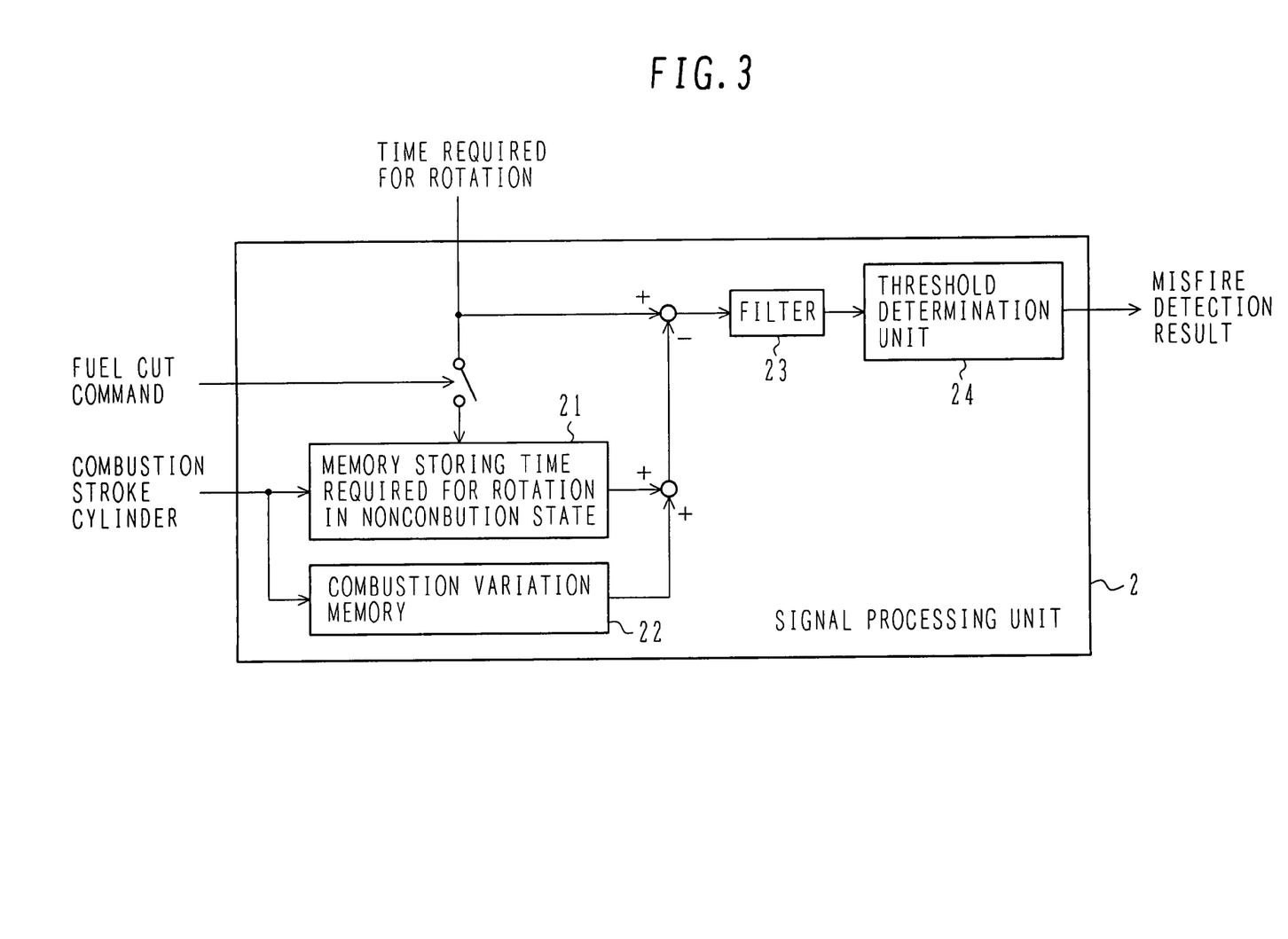
FIG. 3 is a block diagram showing one example of a signal processing unit in the first embodiment of the present invention.

FIG. 3 shows one example of configuration of the signal processing unit in the misfire detection system. The signal processing unit 2 comprises a non-combustion state time-required-for-rotation memory 21 for storing the time required for the rotation per cylinder when a fuel cut command is issued, a combustion variation memory 22 in which a combustion variation per cylinder is stored in a stage of engine production, a filter 23 for extracting a particular component from a value obtained by subtracting the sum of the time required for the rotation in a non-combustion state and the combustion variation, which are outputted respectively from the above two memories, corresponding to a cylinder determined to be in a combustion stroke, from the time required for the rotation outputted from the rotation detecting unit 1, and a threshold determination unit 24 for determining the occurrence of a misfire when an output of the filter 23 exceeds a threshold.

Figure 4:
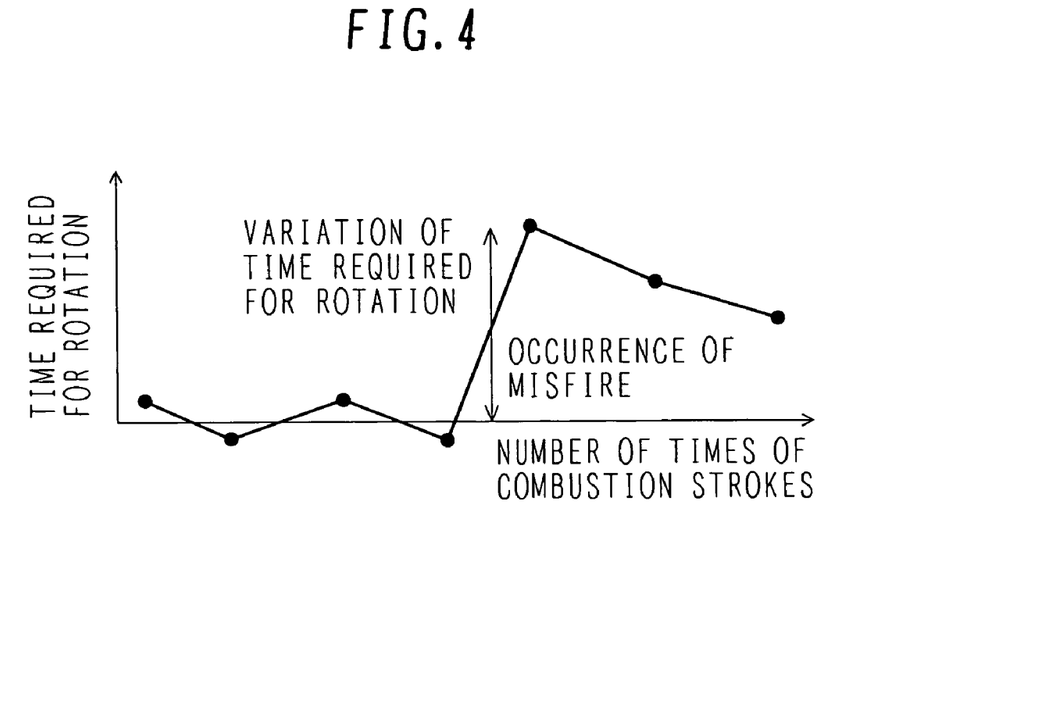
FIG. 4 is a graph showing one example of a time required for rotation in the first embodiment of the present invention.

FIG. 4 shows one example of the time required for the rotation, which is outputted from the rotation detecting unit 1 and is inputted to the signal processing unit 2. Even in a state where no misfires are generated, the time required for the rotation varies to some extent. When a misfire is generated, the variation in the time required for the rotation is increased from that when no misfires are generated. However, as the engine revolution speed increases, the speed increase makes smaller the difference between the magnitude of the variation in the time required for the rotation when no misfires are generated and the magnitude of the variation in the time required for the rotation when a misfire is generated. Accordingly, the accuracy in misfire detection is reduced.

Factors causing the variation in the time required for the rotation include the occurrence of a misfire, the combustion variation per cylinder, and a manufacturing error of the ring gear 11. Therefore, the accuracy in misfire detection can be increased by performing the misfire detection by using a value that is obtained by subtracting, from the time required for the rotation, variations attributable to the combustion variation per cylinder and the manufacturing error of the ring gear 11. The variation in the time required for the rotation attributable to the manufacturing error of the ring gear 11 appears as a variation in the time required for the rotation per cylinder when the fuel cut command is issued. Also, the variation in the time required for the rotation attributable to the combustion variation mainly depends on unevenness in an amount of exhaust gas recirculation and an intake amount of air defined by design of an intake pipe. In other words, the latter variation primarily depends on design of an engine system, and hardly depends on individual differences of engines. Therefore, the variation in the time required for the rotation attributable to the combustion variation in some engine is substantially the same as that attributable to the combustion variation in another engine manufactured according to the same design.

Figure 5:
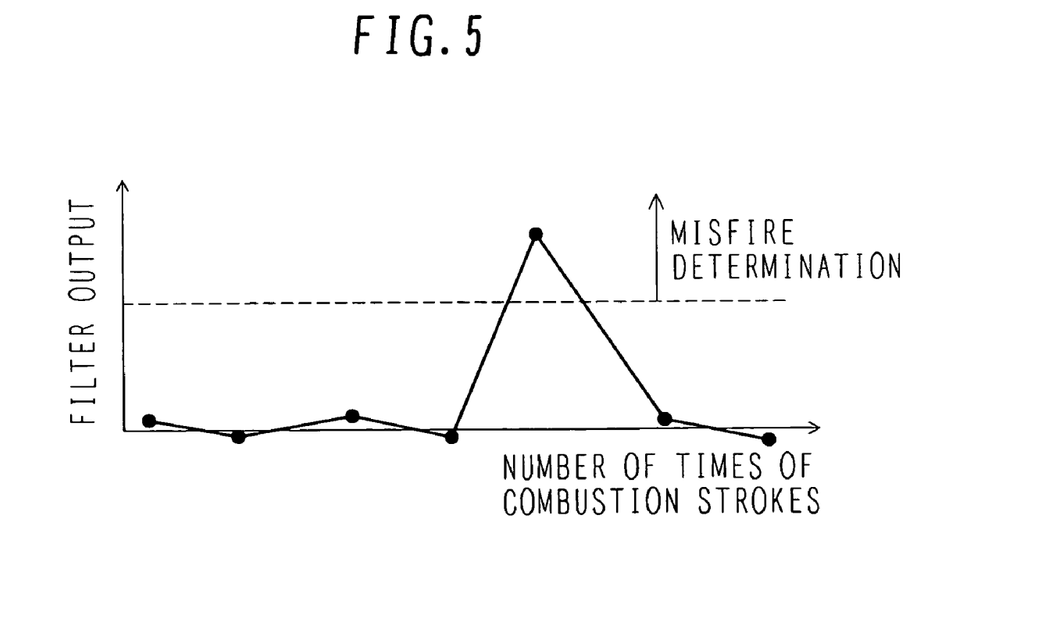
FIG. 5 is a graph showing one example of a filter output in the first embodiment of the present invention.

In view of the above, as shown in FIG. 3, the signal processing unit 2 includes the non-combustion state time-required-for-rotation memory 21 and the combustion variation memory 22. When the fuel cut command is issued, the time required for the rotation per cylinder is stored in the non-combustion state time-required-for-rotation memory 21 with respect to a combustion stroke cylinder, i.e., a cylinder which is determined to be in the combustion stroke at that time by a combustion-stroke cylinder determining unit 5. Also, in the stage of engine production, the variation in the time required for the rotation attributable to the combustion variation is stored in the combustion variation memory 22 with respect to the combustion stroke cylinder. When the fuel cut command is not issued, the time required for the rotation in the non-combustion state stored in the non-combustion state time-required-for-rotation memory 21 and corresponding to the combustion stroke cylinder and the variation in the time required for the rotation attributable to the combustion variation stored in the combustion variation memory 22 and corresponding to the combustion stroke cylinder are both subtracted from the time required for the rotation which is obtained from the rotation detecting unit 1. A value obtained by that subtraction represents the variation in the time required for the rotation attributable to the presence or absence of a misfire with high accuracy. In view of the above, that value is passed through the filter 23 to extract the variation in the time required for the rotation attributable to the presence or absence of a misfire, as shown in FIG. 5. One example of the filter 23 used for obtaining the variation in the time required for the rotation attributable to the presence or absence of a misfire, shown in FIG. 5, from the time required for the rotation, shown in FIG. 4, is a filter that subtracts, from the passage time of the cylinder in the combustion stroke at the present timing, the passage time of the preceding cylinder. The threshold determination unit 24 determines, as shown in FIG. 5, the presence of a misfire if an output of the filter 23 exceeds a certain value (threshold), and the absence of a misfire if it does not exceed the certain value.

As a result, the variation in the time required for the rotation attributable to the combustion variation and the variation in the time required for the rotation attributable to the manufacturing error of the ring gear 11 are compensated, and the opposed cylinder misfire can be detected with high accuracy.

Figure 6:
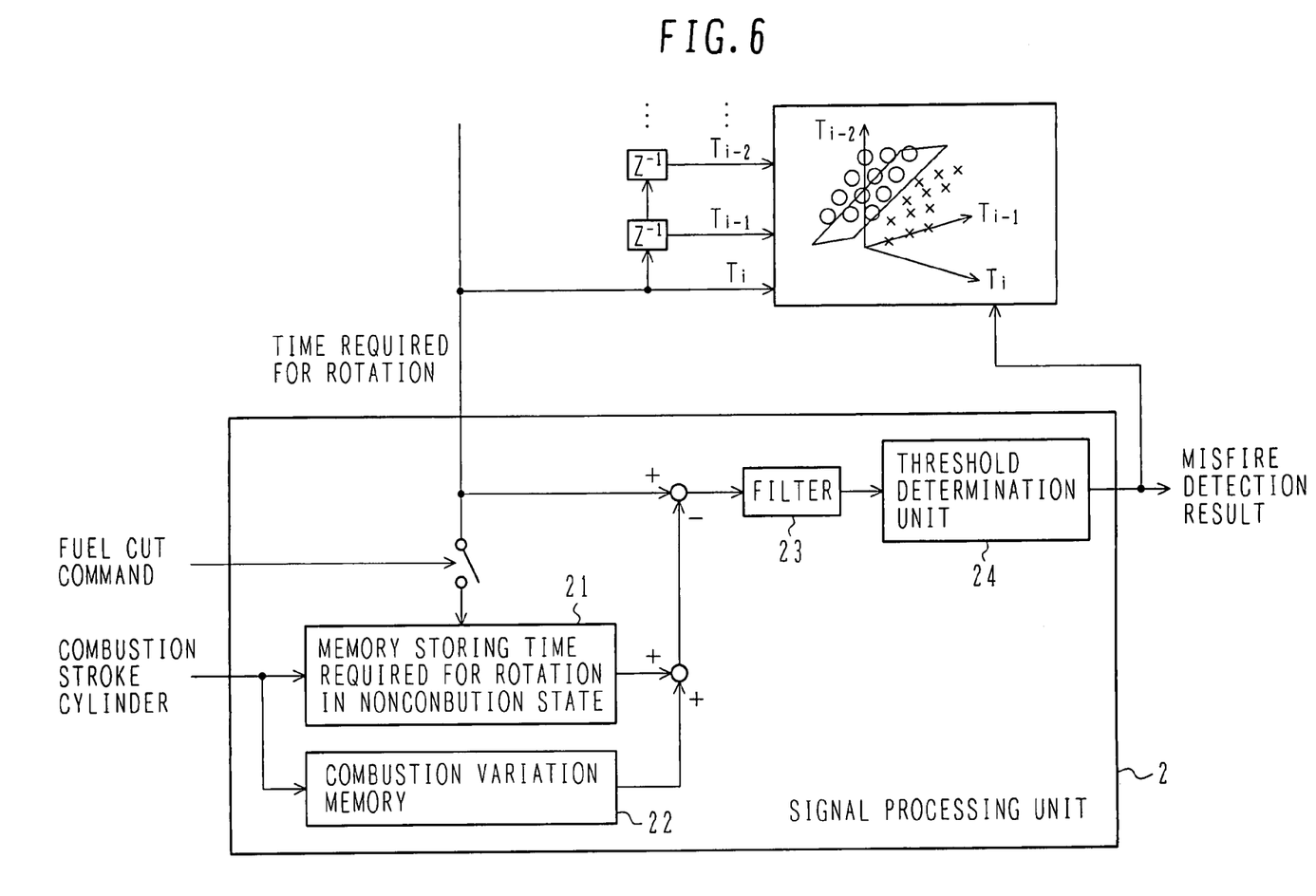
FIG. 6 is a block diagram for explaining a method of confirming whether the present invention is implemented in actual application.
Figure 7:
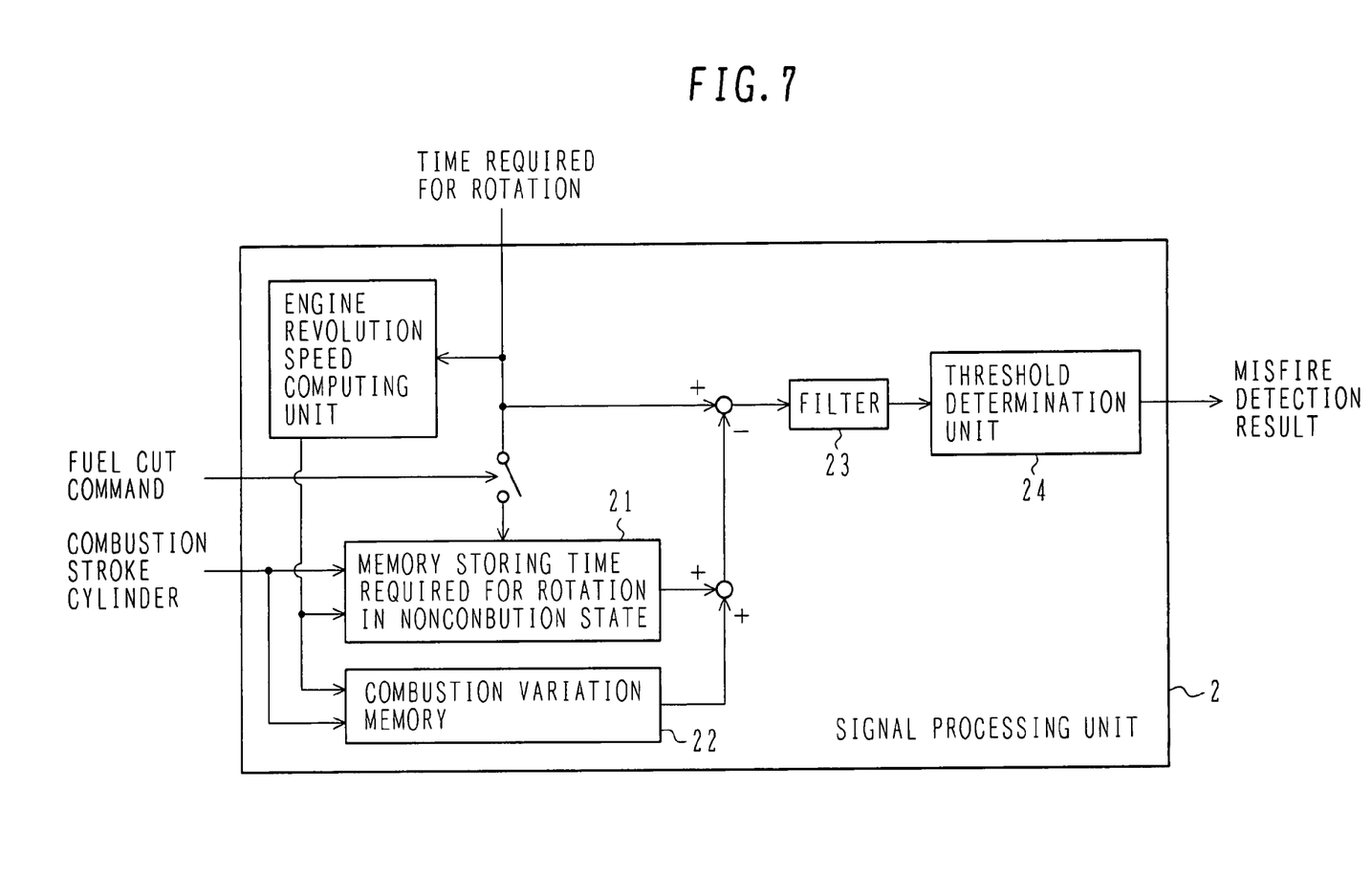
FIG. 7 is a block diagram showing one example of a signal processing unit in a second embodiment of the present invention.

The case of practicing this first embodiment as an actual misfire detection system will be described below with reference to FIG. 6. It is here assumed that the time required for the rotation, which is outputted from the rotation detecting unit 1 at some timing, is Ti, the time required for the rotation outputted at timing preceding one cycle is Ti-1, the time required for the rotation outputted at timing preceding two cycles is Ti-2, and so on. The result of the misfire detection is plotted in a space having axes defined by Ti, Ti-1, Ti-2, etc. such that a symbol x is marked when the result of the misfire detection shows the occurrence of a misfire and a symbol ○ is marked when the result of the misfire detection shows normal combustion. By plotting the marks in such a manner, as shown in FIG. 7, the space is divided into a region of the symbol ○ and a region of the symbol x with a certain plane being a boundary.

The variation in the time required for the rotation attributable to the combustion variation, which is stored in the combustion variation memory 22, depends on the combustion stroke cylinder. Therefore, the result of the misfire detection is also changed depending on the combustion stroke cylinder. If the region of the symbol ○ and the region of the symbol x in the space defined by the axes Ti, -1, Ti-2, etc., shown in FIG. 6, are changed depending on only the combustion stroke cylinder when the values stored in the non-combustion state time-required-for-rotation memory 21 are held constant by not issuing the fuel cut command, this can be regarded as indicating that the combustion variation memory 22 depending on the combustion stroke cylinder is properly used.

Also, it is assumed that the time required for the rotation corresponding to the j-th cylinder when the fuel cut command is issued is τj and the difference τj and the time required for the rotation corresponding to the j-th cylinder when the fuel cut command is issued at the preceding timing is Δτj. After the fuel cut command is brought to an end and the misfire detection is started, the result of the misfire detection is plotted in the space defined by the axes Ti, Ti-1, Ti-2, etc., as shown in FIG. 6, such that a symbol x is marked when the result of the misfire detection shows the occurrence of a misfire and a symbol ○ is marked when the result of the misfire detection shows normal combustion (the space being referred to as a "misfire space"). Assuming that the combustion stroke cylinder at the present timing is j(i), the combustion stroke cylinder at the timing preceding one cycle is j(i-1), the combustion stroke cylinder at the timing preceding two cycles is j(i-2), the misfire space is shifted by Δτj(i), Δτj(i-1), Δτj(i-2), etc. in directions of the axes Ti, Ti-1, Ti-2, etc. in comparison with the misfire space prior to the fuel cut when the non-combustion state time-required-for-rotation memory 21 is provided. Whether the present invention is implemented as in this first embodiment can be confirmed based on such a shift of the misfire space.

While the above description has been made of the signal processing unit 2 in the first embodiment shown in FIG. 3 with no consideration paid to the engine revolution speed, the time required for the rotation in the non-combustion state and the combustion variation depend on the engine revolution speed. In a second embodiment of the present invention, therefore, the signal processing unit 2 is constituted in consideration of the engine revolution speed. FIG. 7 shows the configuration of the signal processing unit 2 in the second embodiment. The signal processing unit 2 in the second embodiment is constituted by adding an engine revolution speed computing unit 25 to the signal processing unit 2 in the first embodiment so that the time required for the rotation is compensated by using the data stored in the non-combustion state time-required-for-rotation memory 21 and the combustion variation memory 22 depending on the engine revolution speed.

The engine revolution speed computing unit 25 computes an engine revolution speed n from the time T required for the rotation, which is outputted from the rotation detecting unit 1, based on sing the following formula:

$$n=1/(3T)$$

A time T_nofire required for the rotation in the non-combustion state is inversely proportional to the engine revolution speed n. Therefore, when fuel is cut, a value obtained by multiplying the passage time of each cylinder by the engine revolution speed is stored in the non-combustion state time-required-for-rotation memory 21. When fuel is supplied, the value stored in the non-combustion state time-required-for-rotation memory 21 and corresponding to the cylinder, which is determined to be in the combustion stroke in accordance with the output of the combustion-stroke cylinder determining unit, is divided by the engine revolution speed to compute the time required for the rotation in the non-combustion state for the relevant cylinder. The computed time required for the rotation is then used to compensate the time required for the rotation which is obtained from the rotation detecting unit 1.

The variation in the time required for the rotation attributable to the combustion variation is not always inversely proportional to the engine revolution speed. In other words, the variation in the time required for the rotation attributable to the combustion variation may have a constant value per cylinder or may be given as a function of the engine revolution speed per cylinder. When a value of the variation is constant per cylinder, the variation in the time required for the rotation attributable to the combustion variation, which is stored in the combustion variation memory 22, is given as one value per cylinder. When a value of the variation is changed depending on the engine revolution speed, it is given, for example, by preparing a map representing the relationship between the engine revolution speed and the variation in the time required for the rotation attributable to the combustion variation, or parameters of a function representing the relationship between the engine revolution speed and the variation in the time required for the rotation attributable to the combustion variation. In any case, the variation in the time required for the rotation attributable to the combustion variation is stored in the combustion variation memory 22 in the stage of engine production.

Thus, the opposed cylinder misfire can be detected with higher accuracy by adding the engine revolution speed computing unit to the signal processing unit 2 in the first embodiment and by compensating the time required for the rotation by using the data stored in the non-combustion state time-required-for-rotation memory 21 and the combustion variation memory 22 depending on the engine revolution speed.

What is claimed is:

1. A misfire detection system for an internal combustion engine, comprising rotation detecting means for measuring a time required for a crankshaft of an internal combustion engine to rotate through a certain angle, and signal processing means for processing the time required for the rotation and detecting a misfire in said internal combustion engine, wherein said signal processing means comprises:

a non-combustion state time-required-for-rotation memory for storing the time required for the rotation per cylinder when a fuel cut command is issued;

a combustion variation memory in which a combustion variation per cylinder is stored in a stage of engine production;

a filter for extracting a particular component from a value obtained by subtracting the sum of the time required for the rotation in a non-combustion state and the combustion variation, which are outputted respectively from said two memories, corresponding to a cylinder determined to be in the combustion stroke, from the time required for the rotation outputted from said rotation detecting means; and threshold determination means for determining the occurrence of a misfire when an output of said filter exceeds a threshold.

2. The misfire detection system for the internal combustion engine according to claim 1, wherein engine revolution speed computing means for computing an engine revolution speed from the time required for the rotation is added to said signal processing unit, and the time required for the rotation is compensated by using data stored in said non-combustion state time-required-for-rotation memory and said combustion variation memory depending on the engine revolution speed.

* * * * *